Oct. 22, 1946.					R. W. LUCE					2,409,702
FASTENER
Filed June 19, 1942					2 Sheets-Sheet 1
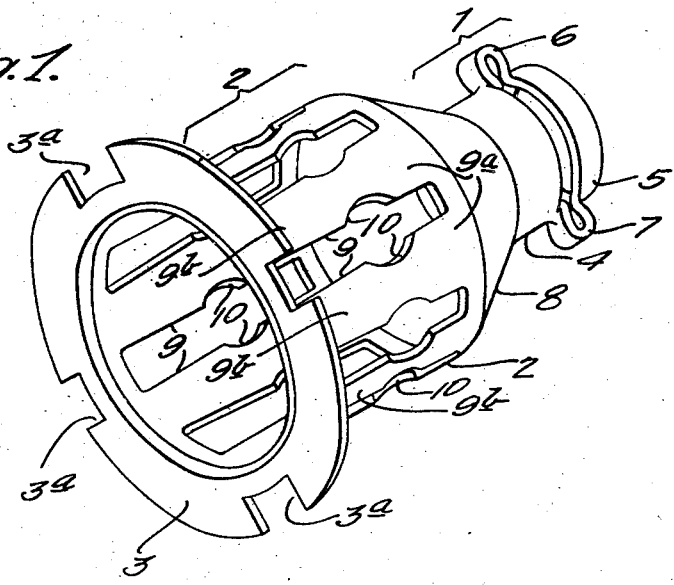
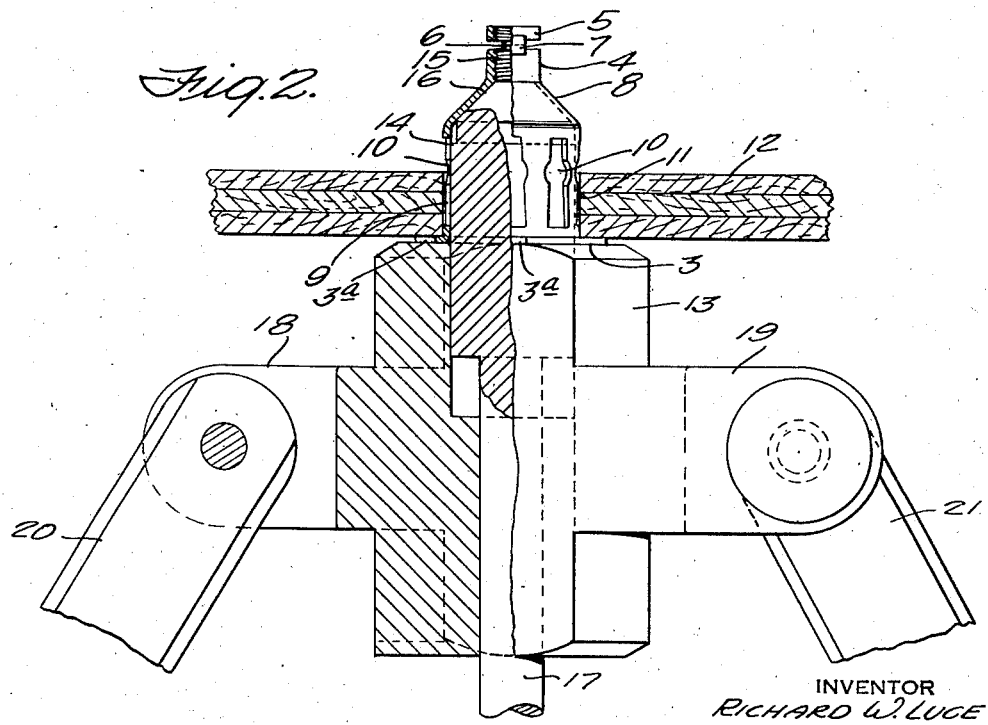
INVENTOR
RICHARD W. LUCE
BY
George T. Gill
ATTORNEY Oct. 22, 1946.　　　　R. W. LUCE　　　　2,409,702
FASTENER
Filed June 19, 1942　　　　2 Sheets-Sheet 2

INVENTOR
RICHARD W. LUCE
BY
George T. Gill
ATTORNEY

Patented Oct. 22, 1946

2,409,702

UNITED STATES PATENT OFFICE 2,409,702

FASTENER

Richard W. Luce, Southport, Conn.

Application June 19, 1942, Serial No. 447,732

3 Claims. (Cl. 85—40)

The invention herein disclosed relates to a fastener that is especially suitable for use in conjunction with a so called "blind fastening," that is, where the fastener is inaccessible in the assembled relation of the parts.

In certain constructions blind fastenings occur, particularly where plates or other sheets of material are so arranged that the fastener through which they are secured together is inaccessible in their assembled relation. In addition, there are certain constructions in which it is highly desirable to secure the fastener at the blind side after the member has been assembled and the blind side is inaccessible. For such situations a fastener is required which, by its assembly in the structure, is retained in position, and in the case of a threaded fastener, restrained against rotation.

The primary object of this invention is to provide a fastener that may be secured at the inaccessible or "blind" side of a structure from the accessible side thereof. Another object of the invention is to provide a fastener of this kind from sheet metal. A further object of the invention is to provide a fastener of this kind that is suitable for plywood structures.

Figure 3:
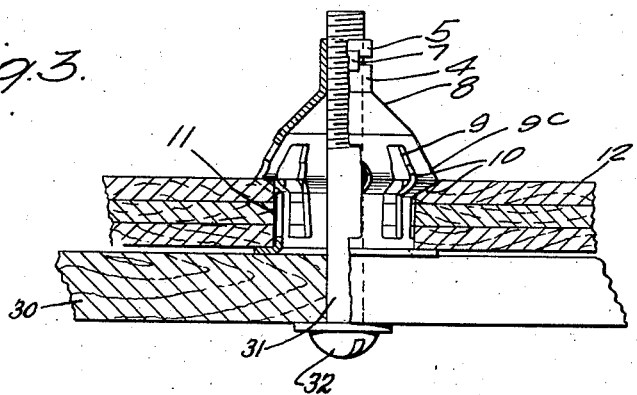
Figure 4:
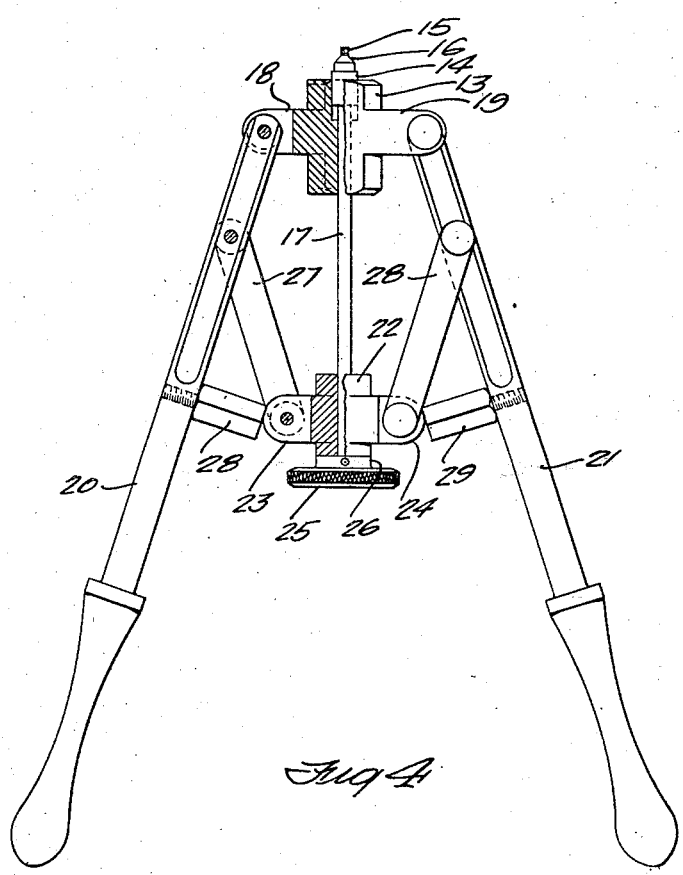

A threaded fastener of this kind, constituting one specific embodiment of the invention, is illustrated in the accompanying drawings and described in detail below. The drawings include:

Fig. 1 which is an isometric view of the fastener;

Fig. 2 which is a semi-sectional elevation of the same with a tool therein;

Fig. 3 which is a semi-sectional elevation of an assembly secured by the fastener; and Fig. 4 which is a semi-sectional elevation of a tool used with the fastener.

The crimp fastener illustrated in the drawings is especially suitable for plywood constructions. It is particularly useful in certain crafts, such as airplanes, that are now being constructed of plywood and in which constructions a number of blind fasteners occur. In general, the fastener includes three sections; an internally threaded tubular section or fastener element 1, a cylindrical section or barrel 2 of larger diameter than the threaded section, and an outwardly extending radial flange 3 at the end of the cylindrical section. The entire fastener is made from a single piece of sheet metal.

The fastener element or threaded section of the fastener illustrated constitutes a threaded locking device of the kind disclosed in United States Letters Patent No. 2,265,661, issued December 9, 1941. This section includes a threaded body portion 4 having the load-carrying threads therein, another threaded portion 5 axially spaced from the body portion 4, and a resilient portion securing the two threaded portions and normally holding the threaded portions with the threads thereof out of phase in a direction towards each other. The resilient portion is constituted by two, diametrically opposite, outwardly extending, resilient elements 6 and 7. These resilient elements are arranged as described in the aforesaid Patent No. 2,265,661 so that they partake of a bending action upon relative movement between the threaded portions 4 and 5.

The body portion 4 of the threaded section 1 is united to the cylindrical portion 2 through a frustro-conical portion 8, the cylindrical portion 2 being of greater diameter than the threaded portion 1. This cylindrical section 2 includes a collapsible portion that is made up of a series of spaced strips 9, the material between the strips 9 being removed in the making of the fastener. It is to be noted that the strips 9 vary in width. In the embodiment illustrated the strips are widest adjacent the frustro-conical portion 8, as at 9a and decrease in width to the ends 9b adjacent the flange. By varying the width of the strips, the manner in which the strips bend when the cylindrical portion is compressed, is predetermined. In addition, the edges of the strips 9 may be notched as at 10 to predetermine the plane at which the strips will bend when the fastener is compressed. In the fastener illustrated there are eight such strips, angularly spaced, center to center, through equal angles of forty-five degrees.

The flange extends outwardly from the end of the cylindrical section 2. This flange is provided with four notches 3a, spaced about the flange through equal angles. The notches extend from the end of the flange inwardly as indicated.

In Fig. 2, the fastener is shown within an opening 11 through a sheet of plywood 12. When the fastener is to be placed in the opening and secured therein, it is first placed upon a tool. A suitable tool for this purpose is illustrated in Fig. 4. This tool includes a block 13 in which a plunger 14 is slidably mounted. The plunger is provided with an externally threaded end section 15 and a frustro-conical section 16 between the threaded portion and the plunger proper. A rod 17 secured to the plunger extends through and is slidably mounted in the block 13. From the opposite sides of the block 13, lugs 18 and 19 extend. To these lugs 18 and 19 handles 20 and 21 are respectively secured. The rod 17 passes through and is slidably mounted in another block 22 which is also provided with oppositely extending lugs 23 and 24. On the end of the rod 17 a knurled finger wheel 25 is secured. This finger wheel is provided with a boss 26 which abuts against the block 22. Extending between the lug 23 and the handle 20, there are a pair of links 27 and a similar pair of links 28 extend between the lug 24 and the handle 21.

It will be seen from the foregoing description of the tool illustrated in Fig. 4 that if the handles 20 and 21 are moved apart the block 22 will move toward the block 13. Conversely if the handles 20 and 21 are moved together the block 22 will move away from the block 13. In moving away from the block 13, the block 22 engages the boss 26 on the knurled wheel 25 and draws the plunger into the block 13. For the purpose of determining the extent of movement of the block 21, with reference to the block 13, there are provided stop lugs 28 and 29. These lugs are threaded into the handles 20 and 21 respectively. When the handles 20 and 21 are brought toward each other, the stop lugs 28 and 29 engage the lugs 23 and 24 on the block 22 and prevent further inward movement of the handles, further movement of the block 22 away from the block 13. By interchanging the stop lugs 28 and 29 with others of different length, different adjustments may be obtained.

When the fastener is to be secured in place, the proper stop lugs 28 and 29, for the particular fastener being used, determined by the thickness of the element to which the fastener is to be secured, are threaded into the handles 20 and 21. The fastener element is then placed over the plunger 14 and the knurled wheel 25 is turned to cause the threaded end portion 15 of the plunger to engage the threads in the body portion 4 of the threaded section 1 of the fastener. So mounted on the end of the tool the fastener is extended into the opening, as the opening 11 through the piece of plywood 12. In this position, the handles 20 and 21 of the tool are separated so that the plunger is out sufficiently at least so that the flange of the fastener engages the block 13 and there is no compressive force on the fastener. When the fastener, on the tool, is in the position indicated in Fig. 2, and the flange thereon abuts against the surface of the plywood the handles 21 and 22 are brought together until the stop lugs 28 and 29 engage the lugs 23 and 24. This action causes the block 22, through the wheel 25 and rod 17 to pull the body portion 4 of the fastener element towards the flange.

As the flange is engaged by the end of the block 13 the fastener element is compressed and collapses at the collapsible portion of the cylindrical section. In collapsing the upper portions of the strips 9, that is the portion adjacent to conical section 8 spread outwardly as illustrated in Fig. 3. The strips 9 at the sections 10 dig slightly in to the plywood and the cylindrical portion expands to engage the sides of the opening in the plywood. The effect is illustrated in Fig. 3. When the fastener is thus collapsed, the knurled wheel 25 is rotated to disengage the threaded portion of the fastener and the plunger. The tool is then removed. As may be seen from Fig. 3, when the fastener is thus secured in place it is prevented by the flange and the extended portions 9c of the strips 9 from moving longitudinally in the plywood. The digging in of the strips 9 into the plywood at the edge of the opening prevents the fastener from turning in the opening.

The fastener is thus secured in place even though the side of the plywood 12 at which the threaded section of the fastener is located is inaccessible. To secure another element such as the piece of plywood 30 to the plywood 12, a machine screw is used. The two pieces of plywood may be placed together with a screw opening through the piece 30 in alinement with the threaded section 1 of the fastener. The screw 31 extends through the opening in the piece 30 and into the threaded section 1 of the fastener, the head 32 of the screw 31 engaging the plywood 30.

As the screw 31 is inserted in the threaded section 1 it is received in and engages the thread of the body portion 4 of the nut through which it passes. Upon entering the threaded portion 5 of the threaded section of the fastener, it is necessary, before the threads of the screw can engage the thread of the portion 5 for the resilient portion to expand until the thread of the portion 5 is brought into phase with the thread of the screw. The resilience of the resilient portion thus expanded places an axial force on the screw causing the surface of the thread thereon to engage in the frictional contact with the surface of the thread of the body portion 4. This friction is sufficient to secure the screw against relative rotation with respect to the fastener under forces tending to rotate the screw and due to vibration and shock.

From the foregoing description of the fastener illustrated in the drawings, it will be seen that by this invention there is provided a fastening element which may be secured on the blind or inaccessible side of the element from the accessible side of the element. It will be apparent that while the invention has been illustrated by a fastener that is particularly suitable for plywood, the invention is not so limited as such fasteners may be utilized with other materials.

While the particular embodiment of the invention illustrated in the drawings is made from a single piece of sheet metal, it will be apparent that it may be made from several pieces. For example, each section of the fastener may consist of a separate piece, and the several sections united in various ways.

It will be obvious that various changes may be made by those skilled in the art in the details of the embodiment of the invention illustrated in the drawings and described above within the principle and scope of the invention as expressed in the appended claims.

I claim:

1. A crimp fastener adapted to be crimped in an opening therefor in a plyable structural element and be secured therein against relative rotative and axial movement with respect thereto, the crimp fastener comprising in combination an internally threaded fastener element, a collapsible, substantially cylindrical barrel united at one end by a continuous portion to the fastener element, and an outwardly extending flange at the opposite end, the barrel being of greater internal diameter than the fastener element and including a plurality of bendable strips of substantially uniform thickness extending substantially parallel to the axis of the fastener element and of substantially the full length of the barrel, each strip being of varying resistance to bending throughout its length, whereby upon being compressed axially, the strips expand in the opening and bend in a predetermined manner.

2. A crimp fastener adapted to be crimped in an opening therefor in a plyable structural element and be secured therein against relative rotative and axial movement with respect thereto, the crimp fastener comprising in combination an internally threaded fastener element, a collapsible, substantially cylindrical barrel united at one end by a continuous portion to the fastener element, and an outwardly extending flange at the opposite end, the barrel being of greater internal diameter than the fastener element and including a plurality of bendable strips of substantially uniform thickness extending substantially parallel to the axis of the fastener element and of substantially the full length of the barrel, each strip varying in width throughout its length, whereby upon compression of the barrel, the strips expand in the opening and bend in a predetermined manner.

3. A crimp fastener adapted to be crimped in an opening therefor in a structural element, and be secured therein against rotation with respect thereto, which crimp fastener comprises in combination a lock nut having means for effecting a frictional engagement with the thread of a bolt entered therein, a collapsible, substantially cylindrical barrel of greater internal diameter than the lock nut united at one end by a continuous portion to the lock nut, and an outwardly extending flange at the opposite end, the barrel including a plurality of bendable strips extending substantially parallel to the axis of the fastener element and of substantially the full length of the barrel, whereby upon being compressed axially, the bendable strips engage the structural element and an interengagement between the fastener and structural element is effected to prevent relative rotation of the fastener.

RICHARD W. LUCE.